Nov. 20, 1962 R. M. BLAKE ET AL 3,065,356
ELECTRO-OPTICAL CARD READER
Filed April 14, 1961
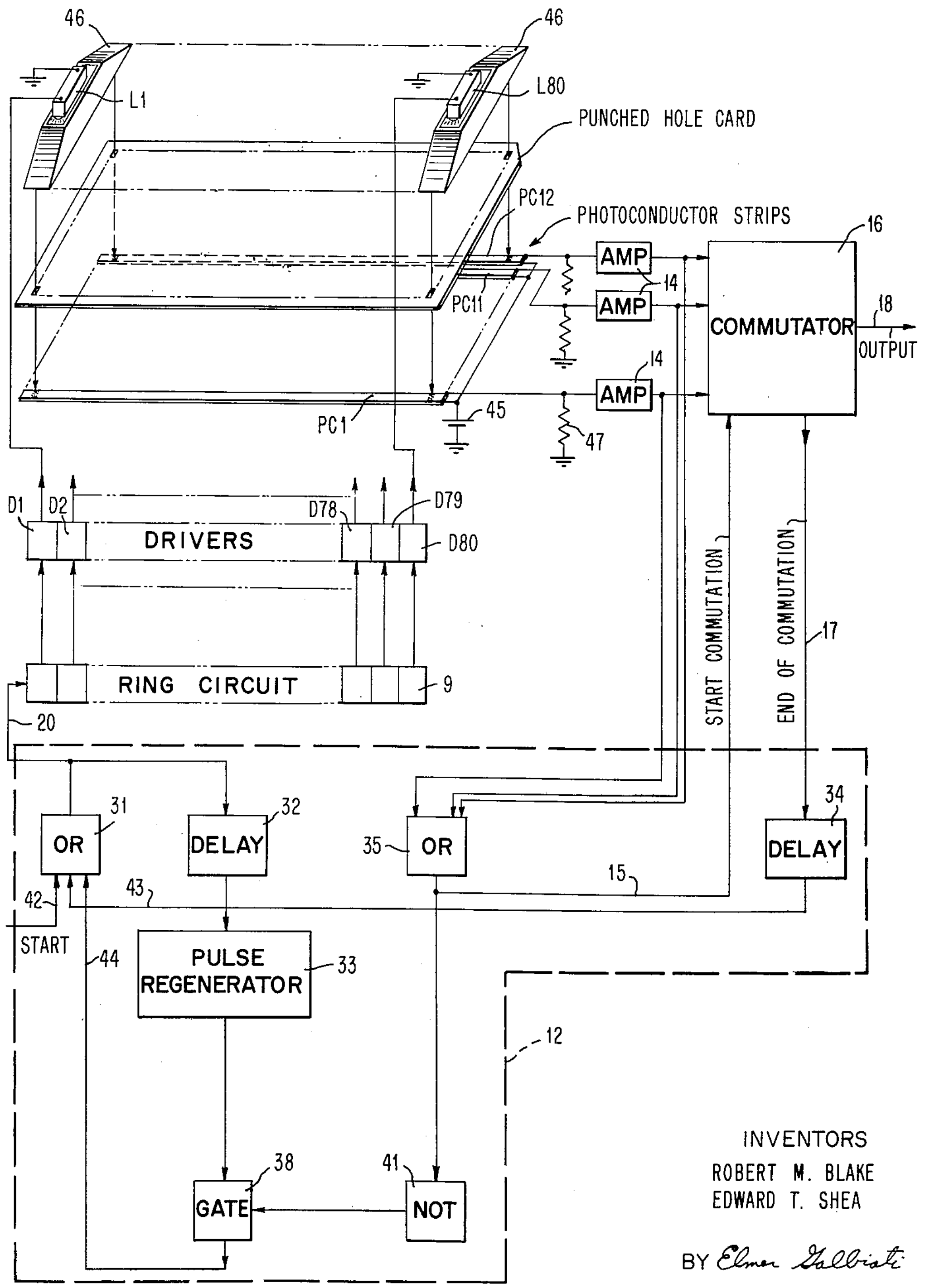
INVENTORS
ROBERT M. BLAKE
EDWARD T. SHEA
BY Elmer Galbiati
AGENT

1

3,065,356

ELECTRO-OPTICAL CARD READER

Robert M. Blake, Wappingers Falls, and Edward T. Shea, Peekskill, N.Y., assignors to International Business Machines Corporation, New York, N.Y., a corporation of New York Filed Apr. 14, 1961, Ser. No. 103,105
5 Claims. (Cl. 250—219)

This invention relates to document reading systems and more particularly to means for increasing the speed of such systems.

The presence or absence of a hole in a plurality of index positions of a card can be determined by positioning a light producing device over each column of index positions on one side of the card and positioning a light receptor over each row of index positions on the other side of the card. By consequentially activating the light producing devices one at a time and by sensing the condition of all of the light receptors each time one of the light producing devices is activated, the presence or absence of holes in the various index positions can be determined.

Light receptors in general have a relatively long decay time, that is, once they have been illuminated, changing their characteristics accordingly, it requires a considerable amount of time after the illumination is removed for the light receptors to return to their original state. Hence, in systems such as that described above, once a photoreceptor has been illuminated by a light producing device it is necessary to postpone the activation of the next light producing device until the photoceptor has returned to its initial condition. If the light producing devices are sequentially activated at a fixed rate the time lapse between the deactivation of one light producing device and the activation of the next light producing device must be sufficient to allow the characteristics of a photoreceptor to change from the illuminated to the non-illuminated condition.

An object of the present invention is to provide a fast electro-optical card reading system.

A further object of the present invention is to provide an electro-optical card reading system in which the time lapse between the activation of the various light producing devices is variable.

Yet another object of the present invention is to provide an electro-optical card reading system in which the time lapse between activation of the various light producing devices is dependent upon the output of the light receptors in the system.

Still another object of the present invention is to provide an electro-optical card reading system in which activation of the light producing devices is controlled by the output of the photoreceptors in the system.

Another object of the invention is a provide an electro-optical card reading system wherein several light producing devices may be simultaneously active.

In order to accomplish the above objects, the present invention provides a feedback type system wherein the activation of the various light producing devices is controlled by the output of the photoreceptors. The length of the period of time between the activation of any two light producing devices is controlled by means which senses whether or not any photoreceptor responds to the light producing devices.

The foregoing and other objects, features and advantages of the invention will be apparent from the following more particular description of a preferred embodiment of the invention as illustrated in the accompanying drawing.

The accompanying sole FIGURE schematically shows

2 the electrical circuitry of the device and it also shows shows the physical components of the device in an exploded fashion.

The illustrative embodiment of the invention shown herein is a system for reading a data card which has twelve rows and eighty columns of index positions. The card contains data in the form of the presence or absence of holes in the various index positions. Eighty light producing devices L1 to L80 are provided, one for each column of the card (for clarity of illustration, only two of the light producing devices are shown). On the opposite side of the card from the light producing devices, twelve photoreceptors, PC1 to PC12 are provided, one for each row of index positions of the data card. (For clarity of illustration, only three of the photoreceptors are shown.)

When the card is in position for reading, a ring circuit (or commutator) 9 produces pulses which successively activate a number of drivers D1 to D80. These drivers, in turn, activate the light producing devices L1 to L80. A control circuit 12 produces pulses which step ring circuit 9, hence, the timing of the pulses produced by circuit 9 is controlled by circuit 12. Outputs from the various photoconductive strips PC1, PC2, etc. are amplified by a number of amplifiers 14 and then gated by a commutator 16 to an output terminnal 18.

The pulses produced by drivers D1 to D80 activate the light producing devices L1 to L80 (hereinafter called lamps) for short periods of time. If there is a hole in the data card beneath a lamp which is activated, the resistance of the photoconductor strip beneath the hole is lowered and a pulse is supplied to the corresponding one of the amplifiers 14 and then to the output 18 by the commutator 16. By observing which lamp is activated (identify the column) and which photoconductor strip responds (identify the row), the particular index position wherein the sensed hole is punched is determined and, hence, the information of the card is read. If more than one hole is punched in the same column, more than one photoconductor strip will respond to the activation of the associated lamp and the signals will be sequentially gated to the output 18 by commutator 16.

Photoresponsive material can be changed from a high resistance state to a low resistance state relatively quickly by the application of illumination; however, after the illumination is terminated, a relatively long period of time is required for the material to return to its high resistance condition. Hence, once there has been a response in one of the photoconductor strips, another lamp cannot be activated to read the next column until the photoconductor strip has returned to its initial state. If this were not done false outputs would be produced since it would not be possible to determine whether a photoconductor strip was in the low resistance state because it had been activated by a then active lamp or by a previously activated lamp. The time delay between the pulses on line 20 which advance ring 9, and hence, the time delay between the activation of the various lamps is controlled by circuit 12.

Circuit 12 senses the outputs of the photoconductors PC1 to PC12.

If, after a lamp is activated, there is no response in any of the photoconductors PC1 to PC12, circuit 12 produces a pulse on line 20 (thereby activating another lamp) a relatively short time after the preceding lamp was activated. If on the other hand there is a response in one of the photoconductors PC1 to PC12 after a lamp is activated, circuit 12 produces a pulse on line 15 thereby starting commutator 16. Commutator 16 sequentially scans the output of each of the amplifiers 14 and sequentially gates any signals which are present to the output 18.

After the commutator 16 completes its scan it produces a pulse on line 17. After a delay introduced by circuit 34 (which allows the photoconductors to return to their non-illuminating "high" resistance state) the pulse steps ring circuit 9 (through OR circuit 31) and activates the next lamp.

Hence, if after a lamp is activated there is no response in any of the photoconductors PC1 to PC12, another lamp is activated after a relatively short time delay (introduced by circuit 32) whereas if after a lamp is activated there is a response in one of the photoconductors PC1 to PC12, another lamp is not activated until the commutator 16 scans each of the output amplifiers 14 and until a delay introduced by circuit 34 has allowed the photoconductors to return to their nonilluminated state (a relatively long time delay).

Where there is no response in the photoconductors due to the activation of one lamp, another lamp may be activated before that lamp is extinguished. However, when there is a response in a photoconductor, due to a lamp, a sufficient delay must be allowed after that lamp is extinguished for the photoconductors to return to their non-illuminated state.

Ring circuit 9 is a standard type of stepping circuit or commutator which always has one of its outputs active. The particular output which is active is determined by the input line 20. Each time the ring circuit 9 receives an input pulse on line 20 (after receiving a first or starting pulse) it steps ahead one position, that is, it deactivates the then active output and activates the next output. The first pulse received by circuit 9 is effective to activate the first output rather than to step the circuit. Ring circuits which accomplish this function are well known and no further description will be given.

The pulse drivers D1 to D80 are single shot multi-brators each of which produces an output pulse of short duration when its input is activated by ring circuit 9. Each output pulse which the drivers D1 to D80 produce is sufficient to activate one of the lamps L1 to L80 for a short period of time.

Circuit 12 produces pulses on line 20 at a frequency which is dependent upon whether or not it senses an output in any one of the photoconductor strips PC1 to PC12. Circuit 12 comprises OR circuits 31 and 35, delay circuits 32 and 34, pulse regenerator 33, gate circuit 38 and inverter (i.e. NOT circuit) 41. Output pulses are produced on line 20 whenever the OR circuit 31 receives an input pulse on any one of the lines 42, 43, or 44.

A pulse is initially supplied on line 42 to start the operation of the circuit by stepping ring circuit 9 to the first position, thereby activating lamp L1.

If the activation of the first lamp (and likewise the activation of any lamp thereafter activated) does produce a response in one of the photoconductors PC1 to PC12 (through a hole in the data card) OR circuit 35 produces an output, inverter 41 does not produce an output and gate 38 is not conditioned. Hence, the output of delay circuit 32 is not fed back to OR circuit 31. The output of OR circuit 35 starts commutator 16 with sequentially gates the output of amplifiers 14 to the output 18. After the commutator 16 has scanned the outputs from all of the amplifiers 14, it produces a pulse on line 17 to indicate that the scanning is complete. The pulse in line 17 is delayed by circuit 34 in order to allow the photoconductors to return to their initial nonilluminated condition and then a pulse is produced on line 43. The pulse on line 43 activates OR circuit 31 thereby producing a pulse on line 20 to step the ring circuit 9 ahead one position.

If the activation of the first lamp (and likewise the activation of any lamp thereafter activated) does not produce a response in any one of the photoconductors PC1 to PC12 (because there is no hole in the particular column of the card) OR circuit 35 does not have an output and inverter 41 produces an output. Gate 38 is therefore conditioned and the output of the delay circuit 32 is gated to OR circuit 31 producing a second pulse on line 20 (a relatively short time after the preceding pulse). Hence, the ring circuit 9 is advanced to a new position a relatively short time delay after it had been previously advanced.

It can therefore be seen that if one or more of the photoconductors PC1 to PC12 is activated when a lamp is activated, the ring circuit 9 is not advanced and another lamp is not activated until the output from the photoconductors have been scanned by commutator 16 and gated to output 18 and until there has been a sufficient delay (introduced by circuit 34) to allow the photoconductor to return to their nonilluminated condition. This is a relatively long time delay. However, if there is not a response in any of the photoconductors after a lamp is activated another lamp is activated after a relatively short time delay which is governed by delay circuit 32.

The light producing devices L1 to L80 are neon bulbs, each of which is provided with a Lucite light path 46 which directs the light to the associated column of the data card. The light from each lamp is shielded from all columns of the card except the one column which it illuminates. It should be noted that for convenience of illustration all the lines from the drivers D1 to D80 are not shown as connected to associated neon bulbs.

Each of the photoconductor strips PC1 to PC12 comprises two conductors, which run length-wise along a strip of photoconductive material. Voltage source 45 supplies a potential to one of the conductors. When the photoconductive material is illuminated by one of the lamps its resistance is reduced thereby producing a higher potential across the associated resistor 47. The voltage output produced by the change in resistance of the photoconductive strips is amplified by the amplifiers 14 and is then gated by commutator 16 to the output 18.

It should be understood that the card shown in the present embodiment could be replaced by other types of documents whereon the indicia is in a different form without departing from the spirit or scope of the present invention.

Furthermore, herein an embodiment is shown wherein the invention is used to overcome a limiting factor in the speed of the card reader introduced by the relatively long turn off time of the light receptor (the photoconductors). It should be understood, however, that the same principle would be applicable in an embodiment wherein the invention was used to eliminate a limitation in speed imposed by a long turn off time of the light producing device.

It should further be understood that the outputs of the device could be gated to the remainder of the system in parallel form rather than in the serial manner as shown herein. This choice is dictated by requirements which are external to the device. One way in which parallel read out could be effected would be to eliminate commutator 16 and to take the outputs from the device directly from amplifier 14. If this were done, line 15 would be connected to line 17 and the length of delay 34 would be appropriately changed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a device for detecting the presence or absence of holes in a data card, the combination of
   a plurality of lamps on a first side of said data card;
   a photoconductor strip on the other side of said data card;
   steppable means for sequentially activating said lamps;
   means for detecting the presence or absence of a response in said photoconductor strip;
   means for advancing said steppable means after a first relatively short delay if no response is detected in said photoconductor strip; and means for advancing said steppable means after a relatively long delay if a response is detected in said photoconductor strip.

2. In a device for detecting the presence or absence of holes at certain index positions in a data card, the combination of a plurality of lamps on the first side of said data card, one of said lamps positioned over each of said index positions;

a photoconductor strip on the second side of said data card, positioned to cover each of said index positions;

commutator means for sequentially activating said lamps;

means for detecting the presence or absence of a response in said photoconductor strip;

means for advancing said commutator means after a first relatively short delay if no response is detected in said photoconductor strip; and means for advancing said commutator after a relatively long delay if a response is detected in said photoconductor strip.

3. In a device for detecting the presence or absence of holes at certain index positions in a data card, said index positions arranged in rows and columns, the combination of a lamp for each column of index positions, said lamp positioned on the first side of said data card, over the corresponding index positions;

a photoconductor strip for each row of index positions, said photoconductor strips positioned over the corresponding row of index positions;

commutator means for sequentially activating said lamps, means for detecting the presence or absence of a response in any one of said photoconductor strips;

means for advancing said commutator after a first relatively short delay if no response is detected in any of said photoconductor strips; and means for advancing said commutator after a relatively long delay if a response is detected in one of said photoconductor strips.

4. In a device for detecting the presence or absence of data bearing indicia at index positions on a document, the combination of a plurality of indicia detecting devices each positioned over a plurality of said index positions, said devices operable to respond to indicia at the respective index position;

commutator means for sequentially activating said indicia detecting means;

means for advancing said commutator after a relatively short delay if said indicia detecting means produce no response; and means for advancing said commutator after a relatively long delay if said indicia detecting means produces a response.

5. In a device for detecting the presence or absence of holes in index positions on a data card, said index positions arranged in rows and columns;

a plurality of lamps on a first side of said card, each lamp illuminating a column of index positions;

a plurality of photoconductor strips on a second side of said card, each photoconductor strip covering one row of index positions;

means associated with each photoconductor strip for detecting a decrease in the resistance of the associated photoconductor strip;

steppable means for sequentially activating said lamps;

means for advancing said steppable means after a first relatively short delay if no response is detected in any of said photoconductor strips; and means for advancing said steppable means after a relatively long delay if a response is detected in any photoconductor strip.

References Cited in the file of this patent

UNITED STATES PATENTS

| | | |
|---|---|---|
| 2,342,345 | Bruce et al. | Feb. 22, 1944 |
| 3,020,534 | Jones | Feb. 6, 1962 |
| 3,028,081 | Knight | Apr. 3, 1962 |